US011093736B1

(12) United States Patent
Patel et al.

(10) Patent No.: US 11,093,736 B1
(45) Date of Patent: Aug. 17, 2021

(54) SYSTEMS AND METHODS FOR MACHINE VISION BASED OBJECT RECOGNITION

(71) Applicant: Synchrony Bank, Stamford, CT (US)

(72) Inventors: Ujjval Patel, Stamford, CT (US); Xiaodan Du, Stamford, CT (US); Lucas McDonald, Stamford, CT (US)

(73) Assignee: SYNCHRONY BANK, Stamford, CT (US)

( * ) Notice: Subject to any disclaimer, the term of this patent is extended or adjusted under 35 U.S.C. 154(b) by 0 days.

(21) Appl. No.: 17/156,207

(22) Filed: Jan. 22, 2021

Related U.S. Application Data

(60) Provisional application No. 62/965,367, filed on Jan. 24, 2020.

(51) Int. Cl.
*G06K 9/00* (2006.01)
*G06N 3/08* (2006.01)
*G06Q 20/32* (2012.01)
*G06N 3/04* (2006.01)
*G06Q 20/12* (2012.01)

(52) U.S. Cl.
CPC ..... *G06K 9/00342* (2013.01); *G06K 9/00288* (2013.01); *G06K 9/00771* (2013.01); *G06N 3/04* (2013.01); *G06N 3/08* (2013.01); *G06Q 20/12* (2013.01); *G06Q 20/3224* (2013.01)

(58) Field of Classification Search
CPC ........... G06K 9/00342; G06K 9/00288; G06K 9/00771; G06K 9/0071; G06Q 20/3224; G06Q 20/12; G06Q 10/087; G06Q 20/204; G06Q 20/208; G06N 3/04; G06N 3/08; G06T 2207/10016

USPC ......................................................... 382/103
See application file for complete search history.

(56) References Cited

U.S. PATENT DOCUMENTS

| | | | | |
|---|---|---|---|---|
| 8,219,438 B1* | 7/2012 | Moon | ................ | G06Q 30/0201 705/7.29 |
| 8,448,858 B1* | 5/2013 | Kundu | ................... | G06Q 20/00 235/383 |
| 9,064,161 B1* | 6/2015 | Boman | ..................... | G06K 7/01 |
| 9,911,290 B1* | 3/2018 | Zalewski | ............. | G06Q 20/327 |
| 10,474,991 B2* | 11/2019 | Fisher | .................. | G06Q 10/087 |
| 10,853,965 B2* | 12/2020 | Fisher | ..................... | G06F 16/53 |
| 2004/0249497 A1* | 12/2004 | Saigh | ...................... | E04H 14/00 700/216 |
| 2007/0124077 A1* | 5/2007 | Hedlund, Jr. | ........ | G06Q 10/087 701/300 |

(Continued)

FOREIGN PATENT DOCUMENTS

WO    WO-2014145953 A2 *  9/2014  ......... G06Q 30/0207

*Primary Examiner* — Mahendra R Patel
(74) *Attorney, Agent, or Firm* — Polsinelli

(57) ABSTRACT

The present disclosure is related to object recognition and tracking using multi-camera driven machine vision. In one aspect, a method includes capturing, via a multi-camera system, a plurality of images of a user, each of the plurality of images representing the user from a unique angle; identifying, using the plurality of images, the user; detecting, throughout a facility, an item selected by the user; creating a visual model of the item to track movement of the item throughout the facility; determining, using the visual model, whether the item is selected for purchase; and detecting that the user is leaving the facility; and processing a transaction for the item when the item is selected for purchase and when the user has left the facility.

30 Claims, 9 Drawing Sheets

(56) References Cited

U.S. PATENT DOCUMENTS

| | | | |
|---|---|---|---|
| 2012/0174525 A1* | 7/2012 | Hinshaw | B25B 21/002 52/741.1 |
| 2013/0215116 A1* | 8/2013 | Siddique | G06Q 20/204 345/420 |
| 2014/0193047 A1* | 7/2014 | Grosz | G06Q 10/10 382/118 |
| 2016/0078300 A1* | 3/2016 | Kundu | G06K 9/00718 348/150 |
| 2016/0110793 A1* | 4/2016 | Herring | G06K 9/00288 705/26.64 |
| 2016/0171577 A1* | 6/2016 | Robinson, Jr. | G06Q 30/0613 705/7.13 |
| 2016/0253885 A1* | 9/2016 | Nassar | G01V 15/00 340/572.1 |
| 2016/0260161 A1* | 9/2016 | Atchley | G05D 1/04 |
| 2017/0115742 A1* | 4/2017 | Xing | G06F 3/0485 |
| 2018/0218224 A1* | 8/2018 | Olmstead | G08B 13/19643 |
| 2018/0260868 A1* | 9/2018 | Peterson | G06K 9/00771 |
| 2018/0276480 A1* | 9/2018 | Peterson | G06K 9/00771 |
| 2019/0244386 A1* | 8/2019 | Fisher | G06F 16/53 |
| 2019/0287096 A1* | 9/2019 | Wah | G06Q 20/204 |
| 2020/0104565 A1* | 4/2020 | Zucker | G06Q 30/0601 |
| 2021/0097577 A1* | 4/2021 | Laserson | G06N 20/00 |

* cited by examiner

SYSTEMS AND METHODS FOR MACHINE VISION BASED OBJECT RECOGNITION

CROSS REFERENCE TO RELATED APPLICATIONS

This application claims priority to U.S. Provisional Application 62/965,367 filed on Jan. 24, 2020, the entire content of which is incorporated herein by reference.

BACKGROUND

Field of the Disclosure

The present disclosure relates to object recognition and tracking using machine vision and more specifically, to a secure system that performs object recognition and tracking using multi-camera driven machine vision.

Description of the Related Art

Object recognition and tracking has many use cases including the ever expanding application of shopping experience for end users where end users visit a facility such as a convenient or a retail store, select items for purchase and exit the facility with the selected items through self-checkout/mobile point of sale (POS) devices. This may be referred to as a grab-and-go process.

The predominant approach currently utilized for a grab-and-go process involves installation of expensive hardware equipment throughout a facility including, but not limited to, RFID tag readers, RBG cameras, depth-sensing cameras and built-in weight sensors. As businesses grow, deployment of such expensive systems and hardware equipment become cost prohibitive because as number of objects and items to be identified and tracked grows, so do the number of deployed systems and equipment needed to perform the identification and tracking.

Accordingly, what is needed is a more cost-effective, scalable and replicable alternative to the above predominant approach for object recognition and tracking and its example application to shopping experience for end users.

SUMMARY

To address the deficiencies in the existing object identification and tracking systems, as described above, the present disclosure provides novel systems and methods for scalable and cost-effective object identification and tracking systems. As will be described, such systems rely on use of low cost cameras for user identification and tracking coupled with reliance on machine learning and computer vision to create visual models of items selected by end users for purchase in order to identify and track the selected items. Creation of these visual models eliminate the need for additional expensive hardware equipment such as, but not limited to, weight sensors, RFID tags and readers, etc., currently utilized for identifying and tracking items selected for purchase in a grab-and-go process, thus providing the scalable and cost-effective object identification and tracking system, as claimed.

One aspect of the present disclosure is a method that includes capturing, via a multi-camera system, a plurality of images of a user, each of the plurality of images representing the user from a unique angle; identifying, using the plurality of images, the user; detecting, throughout a facility, an item selected by the user; creating a visual model of the item to track movement of the item throughout the facility; determining, using the visual model, whether the item is selected for purchase; and detecting that the user is leaving the facility; and processing a transaction for the item when the item is selected for purchase and when the user has left the facility.

In another aspect, the method further includes creating a shopping profile for the user; and updating the shopping profile with the item.

In another aspect, the method further includes associating the item detected with the user.

In another aspect, associating the item detected with the user includes capturing an image of the user at a time of selecting the item; and comparing the image with one of the plurality of images of the user to identify the user and associating the item with the user.

In another aspect, the comparing is performed using a deep neural network trained to identify users using a machine learning algorithm.

In another aspect, the item is detected using a deep neural network trained to identify and label the item.

In another aspect, the visual model is a 2-dimensional representation of the item.

In another aspect, tracking the item is based on the 2-dimensional representation of the item.

In another aspect, the method further includes receiving, from every camera of the multi-camera system, a corresponding 2-dimensional representation of the item; and determining geographical coordinates of the item using 2-dimensional representations of the item received from all cameras of the multi-camera system.

In another aspect, the item is determined to be selected for purchase based on the geographical coordinates.

In another aspect, detecting that the user is leaving the facility includes detecting the user in proximity of entrance of the facility at a first time that is after a second time at which the plurality of images of the user are captured.

In another aspect, the user is detected in the proximity of the entrance at the first time based on one or more images captured by the multi-camera system.

In another aspect, processing the transaction includes a cardless payment transaction and no financial information are exchanged between the user and an operator of the facility.

In another aspect, the cardless payment transaction is processed seamlessly without the user having to confirm a total cost of the transaction.

In another aspect, a prior authorization for conducting seamless transactions at the facility is provided and stored in a user profile at the facility.

One aspect of the present disclosure includes a processing system with memory having computer-readable instructions stored therein and one or more processors. The one or more processors are configured to execute the computer-readable instructions to capture, via a multi-camera system, a plurality of images of a user, each of the plurality of images representing the user from a unique angle; identify, using the plurality of images, the user; detect, throughout a facility, an item selected by the user; create a visual model of the item to track movement of the item throughout the facility; determine, using the visual model, whether the item is selected for purchase; detect that the user is leaving the facility; and process a transaction for the item when the item is selected for purchase and when the user has left the facility.

In another aspect, the one or more processors are further configured to execute the computer-readable instructions to create a shopping profile for the user; and update the shopping profile with the item.

In another aspect, the one or more processors are further configured to execute the computer-readable instructions to associate the item detected with the user.

In another aspect, the one or more processors are configured to execute the computer-readable instructions to associate the item detected with the user by capturing an image of the user at a time of selecting the item; and comparing the image with one of the plurality of images of the user to identify the user and associating the item with the user.

In another aspect, the one or more processors are configured to execute the computer-readable instructions to compare the image with one of the plurality of images of the user using a deep neural network trained to identify users using a machine learning algorithm.

In another aspect, the one or more processors are configured to execute the computer-readable instructions to identify the item using a deep neural network trained to identify and label the item.

In another aspect, the visual model is a 2-dimensional representation of the item.

In another aspect, the one or more processors are configured to execute the computer-readable instructions to track the item based on the 2-dimensional representation of the item.

In another aspect, the one or more processors are further configured to execute the computer-readable instructions to receive, from every camera of the multi-camera system, a corresponding 2-dimensional representation of the item; and determine geographical coordinates of the item using 2-dimensional representations of the item received from all cameras of the multi-camera system.

In another aspect, the item is determined to be selected for purchase based on the geographical coordinates.

In another aspect, the one or more processors are further configured to execute the computer-readable instructions to detect that the user is leaving the facility by detecting the user in proximity of entrance of the facility at a first time that is after a second time at which the plurality of images of the user are captured.

In another aspect, the user is detected in the proximity of the entrance at the first time based on one or more images captured by the multi-camera system.

In another aspect, processing the transaction includes a cardless payment transaction and no financial information are exchanged between the user and an operator of the facility.

In another aspect, the cardless payment transaction is processed seamlessly without the user having to confirm a total cost of the transaction.

In another aspect, a prior authorization for conducting seamless transactions at the facility is provided and stored in a user profile at the facility.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

As noted above, to address the deficiencies in the existing object identification and tracking systems, as described above, the present disclosure provides novel systems and methods for scalable and cost-effective object identification and tracking systems. As will be described, such systems rely on use of low cost cameras for user identification and tracking coupled with reliance on machine learning and computer vision to create visual models of items selected by end users for purchase in order to identify and track the selected items. Creation of these visual models eliminate the need for additional expensive hardware equipment such as, but not limited to, weight sensors, RFID tags and readers, etc., currently utilized for identifying and tracking items selected for purchase in a grab-and-go process, thus providing the scalable and cost-effective object identification and tracking system, as claimed.

The disclosure begins with a description of an example setting in which object recognition and tracking system of the present disclosure may be deployed.

Figure 1:
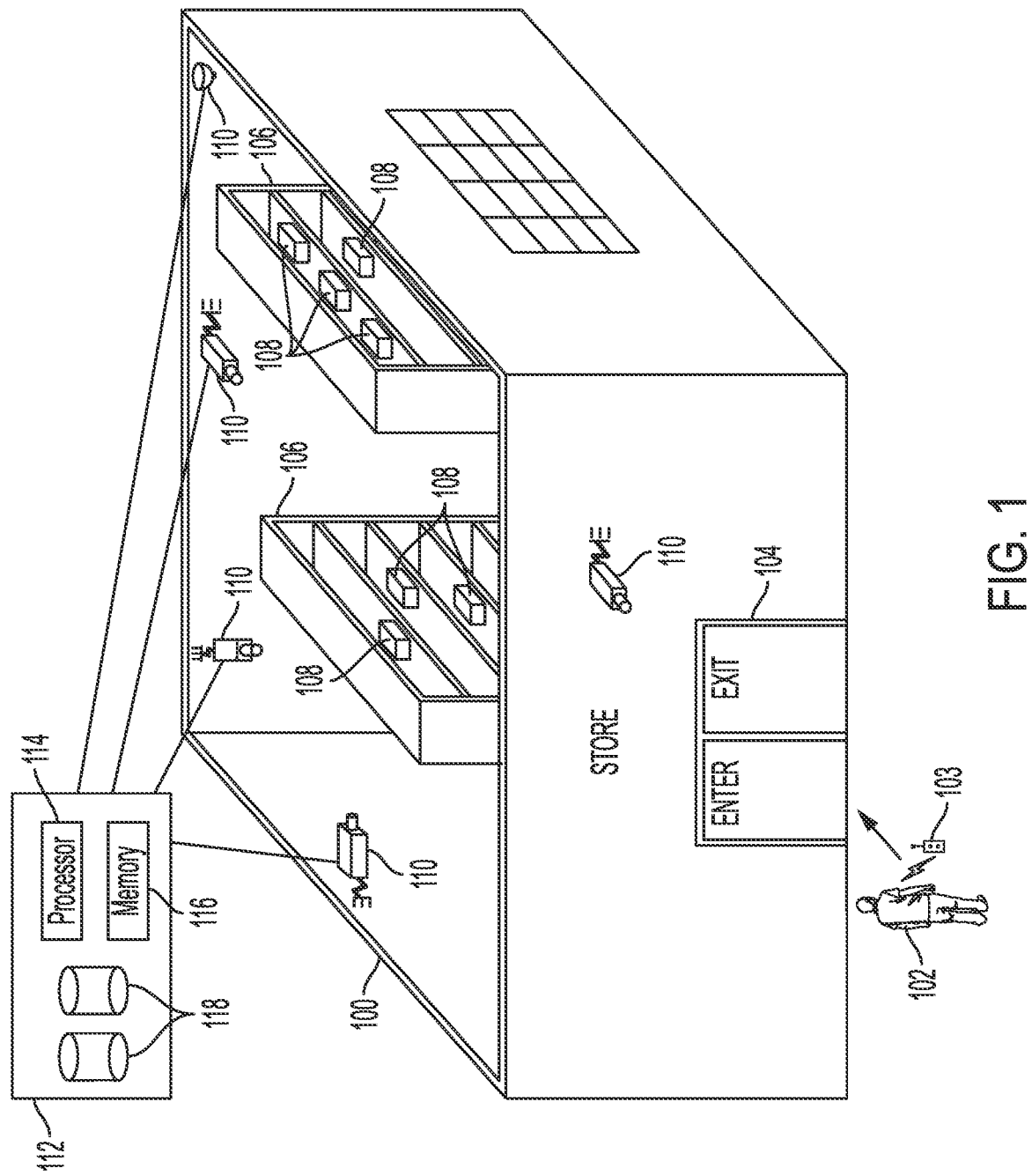
FIG. 1 is an example setting in which an object recognition and tracking system may be deployed, according to one aspect of the present disclosure.

FIG. 1 is an example setting in which an object recognition and tracking system may be deployed, according to one aspect of the present disclosure. Facility 100 may be any type of facility that may be visited by one or more patrons/customers/users 102 (simply users 102 throughout this disclosure) to select one or more items for purchase, rent, etc. Examples of facility 100 include but are not limited to, a convenient store, a retail store, a shopping center, a grocery store, a department store, a hypermarket, a library, a museum, an art gallery, etc.

While throughout this disclosure, facility 100 may imply a single physical location of a particular store, library, museum, etc., the disclosure is not limited thereto. For example, facility 100 may be any one branch of multiple branches of the same store, library, museum, etc.

User 102 may have an electronic device 103 associated therewith. Such electronic device can be any known/or to be developed device capable of establishing wireless communication sessions with nearby devices and/or over the internet. For example, electronic device 103 can be a mobile device, a tablet, etc. electronic device 103 can have short range wireless communication capabilities such as a Bluetooth connection, an RFID chip and reader, etc.

Facility 100 may have an entrance 104 through which user 102 may enter facility 100 and undergo an identification process, which will be further described below with reference to FIG. 2.

Facility 100 may further include one or more shelves/isles 106 of various types of products 108. Such products (items) 108 include, but are not limited to, food items, books, art work, household products, clothing products, consumer electronics products, movies, etc. While Facility 100 is illustrates as having two isles 106, depending on the type of facility 100, such isles 106 may be located on sidewalls or not be present at all. For example, when facility 100 is a museum, products 108 may be placed against walls or on displays without isles/shelves.

Facility 100 may further include cameras 110 (which may also be referred to as visual/media capturing devices 110 or multi-camera system 110). As will be described below, such cameras 110 may be installed throughout facility 100 (e.g., on walls, ceiling, inside isles 106, at entrance 104, on outer perimeters of facility 100, etc.) to implement object identification and tracking as well as user identification and tracking for purposes of implementing a frictionless transaction processing (one in which interactions between user 102 and an operator or point-of-sale device at facility 100 is eliminated or minimized, as will be described below).

Cameras 110 can be any type of known or to be developed image/video/multimedia capturing device including RBG cameras.

Facility 100 may further include a processing system 112. Processing system 112 may include one or more processors 114, one or more memories 116 and databases 118. Processing system 112 may be communicatively coupled to (wired and/or wireless connection) to cameras 110 to obtain images of users and products and perform object identification and tracking as will be described below.

Processing system 112 may be geographically co-located with cameras 110 at facility 100 or may be remotely accessible via cloud. Processing system 112 may be owned and operated by owners and operators of facility 100 or may be a virtual service offered by an independent third party service provider and available via public, private and/or hybrid cloud service providers.

As noted above, one application of image identification and tracking of the present disclosure is implementation of frictionless processing of transactions between merchants and consumers. While image identification and tracking is one component of this seamless processing, another component is proper identification and tracking of consumers within facility 100 such that identified and tracked products can be associated with identified and tracked consumers for proper seamless processing.

Figure 2:
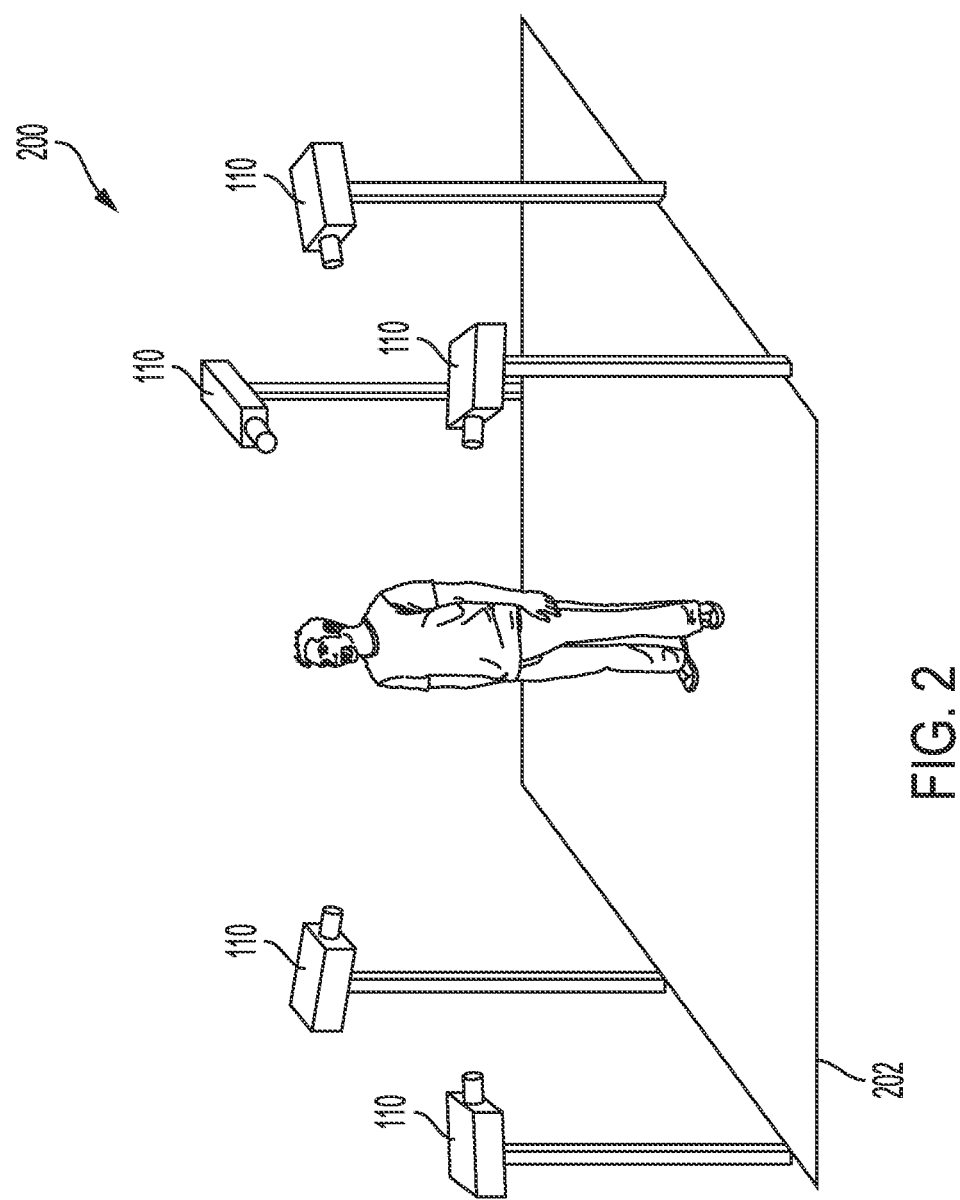
FIG. 2 illustrates a user identification process, according to one aspect of the present disclosure.

FIG. 2 illustrates a user identification process, according to one aspect of the present disclosure. Setting 200 illustrates an area 202 around entrance 104 of facility 100 of FIG. 1, when user 102 steps inside facility 100. Area 202 may be inside facility 100 or may be outside facility 100. As shown, area 202 may be equipped with several cameras 110 surrounding area 202 and user 102 when user 102 steps into area 202. Such cameras capture images and snapshots of user 102 from different angles (e.g., from back, lower body, upper body, etc. to capture outfit, unique facial, body and clothing characteristics, etc.). As will be described below, a facial image of user 102 captured by one of cameras 110 may be used, using a database of user identifications, to identify user 102. Such database may be developed and updated using neural networks trained using machine learning algorithms such that an image of a user can be used to retrieve identification information of user 102. This will be further described below.

Once user 102 is detected using facial image of user 102 captured by one of cameras 110, then other images of user 102 captured by remaining cameras 110 around area 202 may be associated with user 102's profile and be used to track movement of user 102 throughout facility 100.

The capturing of images of user 102 from different angles upon entering area 202 removes vulnerabilities of user tracking systems currently in use where tracking a user in a facility becomes a computationally difficult and/or impossible task if a proper facial image of the user cannot be obtained at any given point in time. For example, it may be difficult to identify a user at a time of selecting an item for purchase, if user's face cannot be captured.

In contrast, by capturing various images of user 102 upon entering facility 100 from different angles, when the user roams throughout facility 100, any image of user 102 captured at any given point in time, can be used and compared to images of user 102 taken initially in area 202 to identify the user 102.

In one example, facility 100 may only include one such area 202 for capturing images of a user entering facility 100 (e.g., when facility 100 is a relatively small convenient store). In another example, when facility 100 is larger with higher user traffic, facility 100 may have multiple such areas at entrance 104 to identify and capture images of different users.

With initial user identification completed at entrance of facility 100 as described with reference to FIG. 2, product identification and tracking will be described next with reference to FIG. 3.

Figure 3:
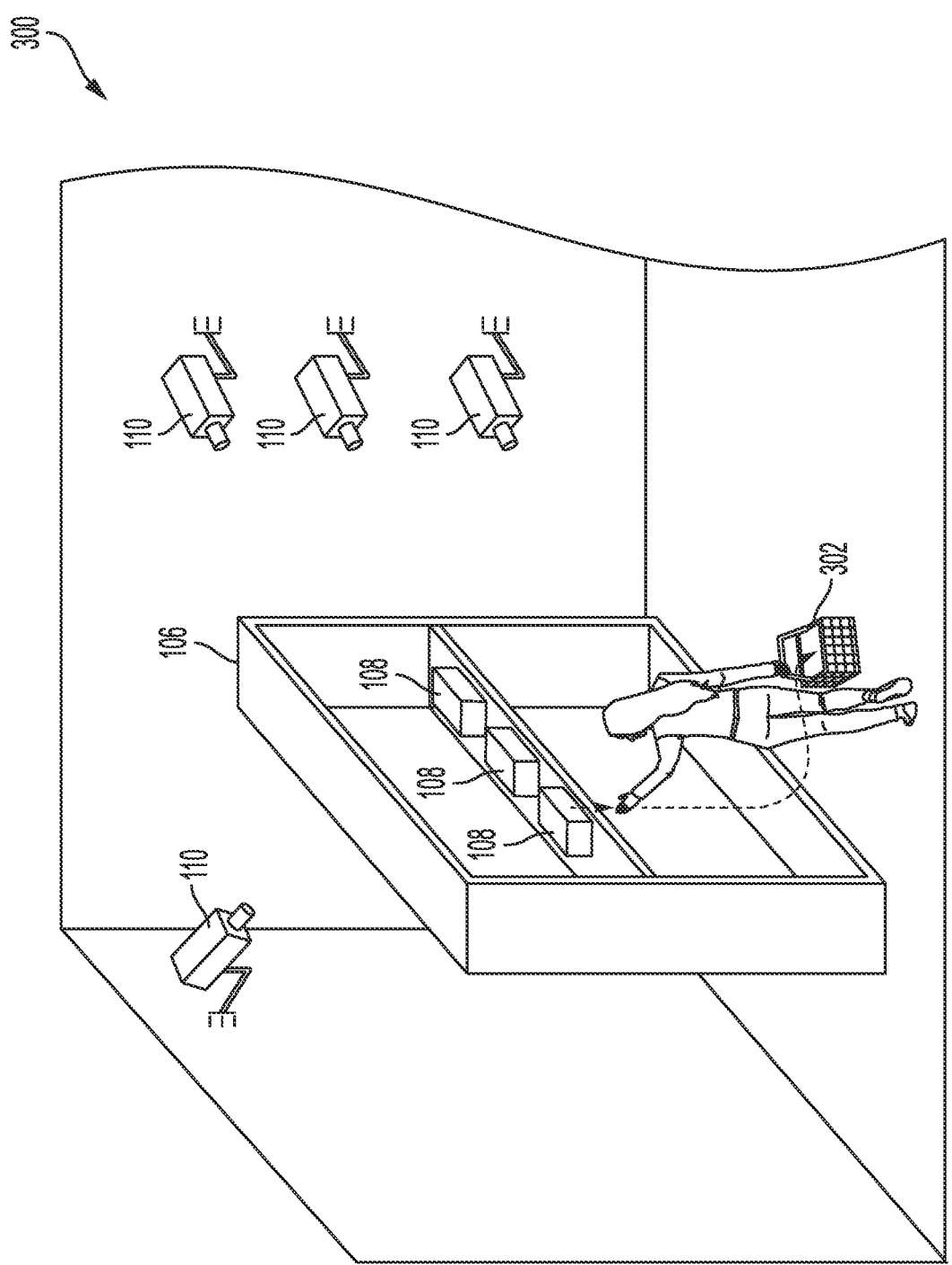
FIG. 3 illustrates product identification and tracking, according to one aspect of the present disclosure.

FIG. 3 illustrates product identification and tracking, according to one aspect of the present disclosure. Setting 300 illustrates a shot of interior of facility 100 of FIG. 1, where user 102 selects a product 108 off of a shelf/isle 106 and places the selected product 108 in basket 302.

Cameras 110 may be installed throughout facility 100 such that no blind spot for cameras 110 exist. Accordingly, when user 102 selects product 108 and places the same in basket 302, multiple cameras 110, as shown in FIG. 3, capture different images of user 102 and the selected product 108 and using computer-vision and image recognition processes, as will be described below, perform object identification and tracking to identify and track user 102 and product(s) 108 selected by user 102 to implement frictionless processing of a transaction for the selected product(s) 108.

Figure 4:
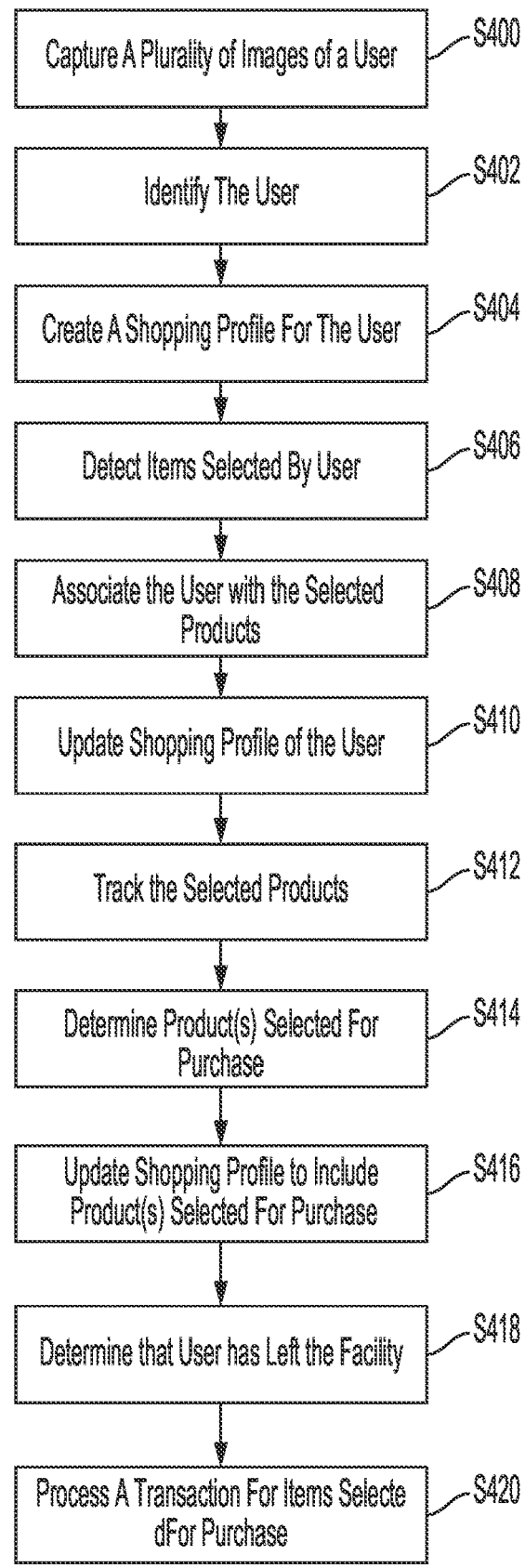
FIG. 4 is a method of object identification and tracking, according to one aspect of the present disclosure.

FIG. 4 is a method of object identification and tracking, according to one aspect of the present disclosure. FIG. 4 will be described from a perspective of processing system 112 of FIG. 1. It should be understood that processing system 112 has one or more processors 114 that execute computer-readable instructions stored on one or more memories 116 to perform steps of FIG. 4. Finally, FIG. 4 will be described with reference to FIGS. 1-3.

At S400, processing system 112 captures a plurality of images of user 102 in area 202 (when user 102 enters facility 100). The plurality of images may be captured via one or more cameras 110 as described above with reference to FIG. 2.

At S402, processing system 112 identifies user 102. In one example, any known or to be developed image recognition technique may be utilized to identify user 102. For example, user 102 may have a corresponding profile with operator/owner of facility 100 that includes name, address, profile picture, financial information, etc. Such profile of user 102 may be stored in one of databases 118. Using an image recognition technique, processing system 112 can extract facial features of user 102 and, for example, match the extracted facial features with profile picture of user 102.

In another example, electronic device 103 of user 102 may be scanned by one or more readers installed at or near area 202 to obtain identification information of user 102, according to any known or to be developed method.

In another example, processing system 112 may process facial features of user 102 and compare the same with one or more publicly available databases (using any known or to be developed method such as deep neural networks trained using machine learning algorithms and publicly available databases for image recognition) to identify user 102.

At S404, processing system 112 creates a shopping profile (shopping cart or virtual shopping cart) for user 102 to include the plurality of images of user 102 and/or any subsequent product 108 selected for purchase. Shopping profile of user 102 may be a temporary profile for any one instance of user 102 visiting facility 100 and making a purchase.

In one example, after completion of user 102's shopping at facility 100, various types of information (e.g., shopping habit, trends, time spent at facility 100 and/or any other statistics about user 102) may be added to a permanent profile of user 102 in one or more databases 118, which can be used in the future for targeting user 102 with coupons, promotions, advertisements, etc.

At S406 and after user 102 is identified and starts roaming around facility 100, processing system 112 detects one or more items selected by user 102 (e.g., placed in basket 302 of FIG. 3).

As noted above, cameras 110 may be installed throughout facility 100 and may capture images of products. Any known or to be developed object detection algorithm may be utilized to identify one or more products 108 selected by user 102. An example algorithm is You Only Look Once (YOLO) that relies on deep learning and convolutional neural networks, in real time, to classify and localize objects within a frame using bounding boxes around objects and associate the same with stored specifications and prices of selected products 108 (object identification and labeling).

Figure 5:
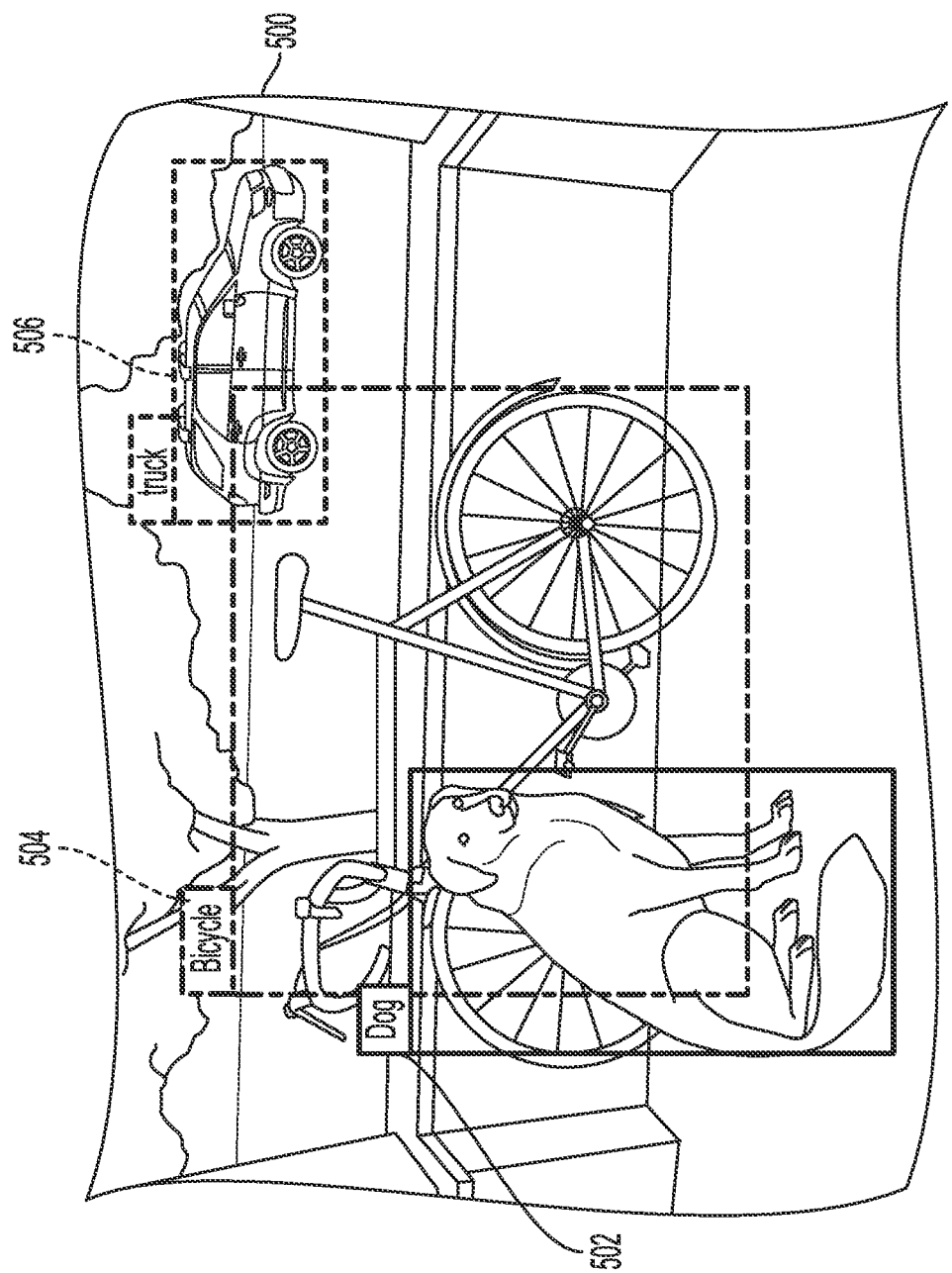
FIG. 5 illustrates a snapshot of an algorithm for object identification and labeling, according to one aspect of the present disclosure.

FIG. 5 illustrates a snapshot of an algorithm for object identification and labeling, according to one aspect of the present disclosure. As shown in FIG. 5, YOLO algorithm may be applied on sample images 500 (which is not related to selected products by a user in a store of a facility but nevertheless equally applicable), to detect dog 502, bicycle 504 and/or truck 506.

In one example, a Graphical User Interface (GUI) may be utilized to manually provide labeling data (e.g., product specification and prices) for training a neural network for object identification and labeling.

In another example, other external databases may be accessed (via an Applicable Programming Interface (API)) to retrieve product information and pricing for training the neural network. For example, a product manufacturer's database of product information and/or other publicly accessible databases may be utilized or accessed to retrieve product labeling information to train the neural network and deploy the trained network to implement product identification and labeling at S406.

A neural network (which will be further described below with reference to FIGS. 7 and 8) may be utilized for object detection and identification within a captured image or frame. Such neural network may operate in real-time such that detected new products can be added to database (e.g., database 118). As part of this real-time training, pre-existing neural networks can be used to automatically label new training data to a reasonable accuracy to quickly recognize new variations of a common product. For example, a neural network trained to detect generic soda cans such as Coca Cola cans can be used to automatically label training images containing new designs for Coca Cola cans.

At S408, processing system 112 associates user 102 with one or more products 108 identified at S406. In one example, at a time of capturing images of one or more products 108, cameras 110 may also capture an image of user 102, which may then be compared against the plurality of images of user 102 captured at S400.

At S410, processing system 112 updates the shopping profile for user 102 created at S404 to include the product(s) 108 identified at S406. In one example, the updated shopping profile may be sent to electronic device 103 to be displayed for user 102.

At S412, processing system 112 tracks the one or more products 108 detected and identified at S406. In one example, such tracking may be based on building a visual model (e.g., a 2-dimensional model) of the one or more products detected and identified at S406. Such tracking may be performed in real-time for purposes of determining whether the one or more products will ultimately be purchased by user 102 or not. Furthermore, the visual model is not necessarily limited to a 2-dimensional model but can be a 3-dimensional model, a 1-dimensional model such as a visual pointer or identifier for the corresponding product, etc.).

In one example, a captured image of a product is a real-world 3-dimensional representation of that product. In one example tracking method, such 3-dimensional representation is transposed to a 2-dimensional representation or model. Any known or to be developed algorithm may be used to implement such transposition. For example, Open Computer Vision (OpenCV) can be leveraged to determine camera distortion coefficient and/or intrinsic/extrinsic camera parameters using a chessboard image or ArUco markers to enable the transposition.

Such calibration is important in order to harmonize and create consensus among captured images of the one or more products 108 by all relevant cameras 110, which is needed to determine a sequence of events (movement of the one or more products 108) throughout facility 100 for ultimate determination of whether the one or more products 108 and/or a subset thereof are purchased or not.

In one example, process of object tracking above may be performed by all relevant cameras 110 that have the one or more product(s) 108 detected at S406 in their field of view. The tracking information from all such cameras 110 are then streamed to processing system 112, where processing system 112 produces "real-world" coordinates of the one or more products 108 detected at S406.

At S414, processing system 112, using "real-world" coordinates of the one or more products 108, determines which one(s) of the one or more products 108 are selected by user 102 for purchase. For example, if such "real-world" coordinate of product A (one of the products detected at S406) correspond to a coordinate within facility 100 after user 102 leaves facility 100, then processing system 112 determines that product A is not selected for purchase. However, if "real-world" coordinate of product A corresponds to a coordinate within area 202 or within a configurable threshold of entrance 104 of facility 100, then processing system 112 determines that product A is selected for purchase.

In another example, cameras 110 may also be installed in outer perimeters of facility 100 and may perform object detection and tracking in the same manner as described above with reference to S406 and S408. Therefore, at S410, if "real-world" coordinate of product A corresponds to an area outside facility 100 (e.g., within field of view of cameras 110 installed outside facility 100), then processing system 112 determines that product A is selected for purchase.

At S416, processing system 112 updates user profile created at S404 to reflect one or more products 108 selected for purchase, as determined at S414. In one example, the updated shopping profile may be sent to electronic device 103 to be displayed for user 102.

At S418, processing system 112 determines if user 102 has left facility 100. Such detection may be through image identification when cameras 110 detect user 102 in area 202 at a second time which is later than a first time at which user 102 was detected entering facility 100 (at S400). In another example, determining that user 102 has left facility 100 can be based on detecting electronic device 103 in area 202, using known or to be developed sensors and readers at entrance 104 and at a second time that is after a first time at which user 102 is detected entering facility 100 (at S400).

Thereafter, at S420, processing system 112 processes a transaction for product(s) 108 in the updated profile of user 102 (per S412). Such processing may be any known or to be developed transaction processing method (e.g., via exchange of financial information of user 102 with a point of sale device at facility 100 or between user device 103 and a point of sale device at facility 100) or may be frictionless payment processing (cardless payment transaction). Such cardless payment processing will be further described below with reference to FIG. 6.

Figure 6:
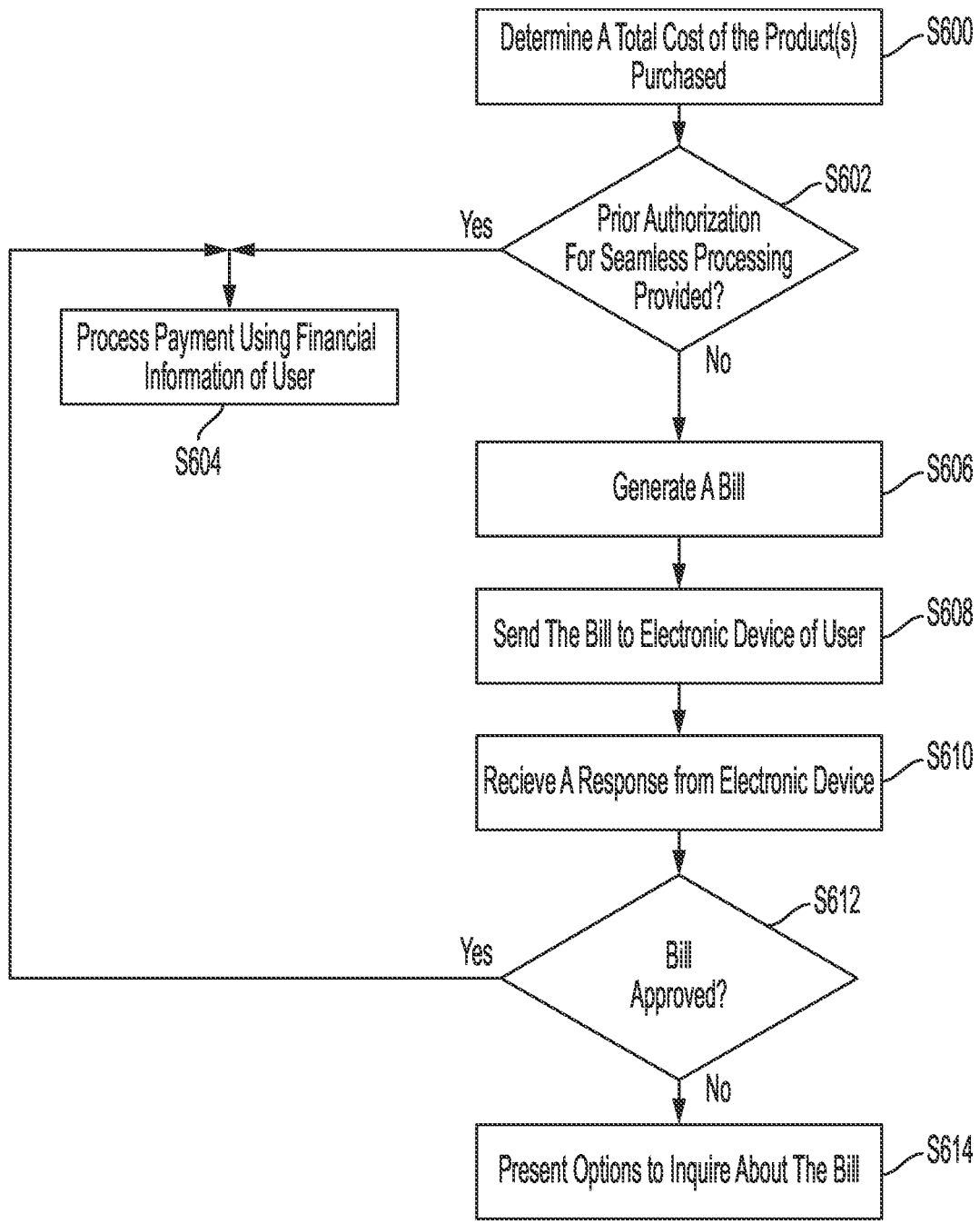
FIG. 6 is an example cardless payment processing method, according to one aspect of the present disclosure.

FIG. 6 is an example cardless payment transaction method, according to an aspect of the present disclosure. FIG. 6 will be described from a perspective of processing system 112 of FIG. 1. It should be understood that processing system 112 has one or more processors 114 that execute computer-readable instructions stored on one or more memories 116 to perform steps of FIG. 4. Finally, FIG. 4 will be described with reference to FIGS. 1-5.

A cardless payment transaction is a transaction whereby no financial information (e.g., credit card numbers, bank account information, etc.) is exchanged between user 102 (or user device 103) and a point of sale device at facility 100, thus providing a secure and safe processing method that eliminates and/or reduces the possibility of unauthorized access to financial information of user 102 and/or owner of facility 100.

In one example, a cardless payment transaction may be seamless where user 102 has previously provided an authorization for facility 100 to process payments for items user 102 purchases at facility 100. Therefore, upon user 102 leaving facility 100, processing system 112 automatically processes and settles the cost of items selected by user 102 for purchase, without user 102 having to provide any type of confirmation or authorization for such processing via user device 103.

For such cardless payment transaction, it is assumed that user 102 has a registered profile with processing system 112, which has stored therein, among other identifying and shopping information, financial information of user 102. Such financial information may include, but is not limited to, credit card information of user 102, bank account information of user 102, etc. Such profile may be stored at database 118 associated with processing system 112.

At S600, processing system 112 determines a total cost associated with product(s) 108 selected for purchase by user 102 per S412 of FIG. 4.

At S602, processing system 112 determines if a prior authorization/indication has been provided and stored in profile of user 102 at processing system 112, for a seamless processing of the transaction.

If at S602, processing system 112 determines that user 102 has previously provided an authorization for a seamless processing of transactions at facility 100, then at S604, processing system 112 uses financial information of user 102 stored in registered profile of user 102 at processing system 112 to process the transaction. Such processing may be performed by contacting financial institution of user 102 and charging user 102's account, as known in the art.

However, if at S602, processing system 112 determines that no prior authorization for a seamless processing of transactions at facility 100 is provided, then at S606, processing system 112 generates a bill for the cost of the product(s) 108 selected for purchase by user 102 per S414 of FIG. 4. Such bill can be an itemized bill displaying quantity and price of each of the selected product(s) 108, the tax for the total cost, and the total cost.

At S608, processing system 112 sends the bill to electronic device 103 for confirmation/authorization. Optionally, there may be a timer associated with S608, where if a response to sending the bill is not received by processing system 112 within a defined (configurable based on experiments and/or empirical studies) time period from the initial sending of the bill, a reminder or notification may be sent to electronic device 103. In one example, if such response is not received after a threshold number (configurable based on experiments and/or empirical studies) of reminders/notifications, processing system 112 automatically reverts back to S604 and the transaction is processed.

At S610, processing system 112 receives a response from electronic device 103. If the response is a confirmation of the bill, the process reverts back to S604 and processing system 112 processes the transaction, as described.

If at S610, processing system 112 receives a response that does not confirm/authorize the bill, at S612 processing system 112 may present, on electronic device 103, options for user 102 to contact facility 100 to dispute/inquire about the bill.

As mentioned above, a neural network may be trained using any known or to be developed machine learning method for identification of users at facility 100 and/or for identification and labeling of products 108.

Figure 7:
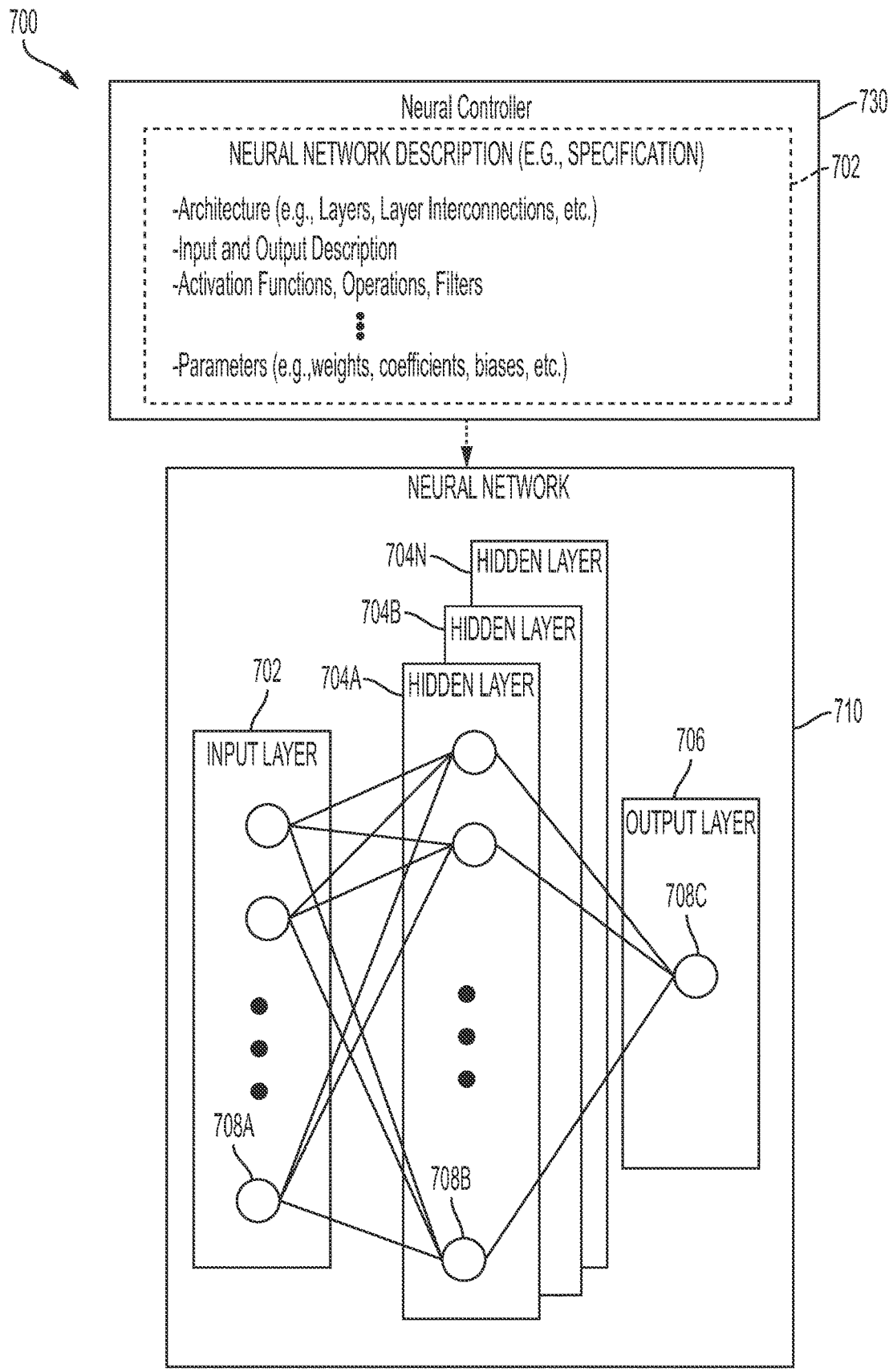
FIG. 7 illustrates an example neural network architecture, according to one aspect of the present disclosure.

FIG. 7 illustrates an example neural network architecture, according to one aspect of the present disclosure. Architecture 700 includes a neural network 710 defined by an example neural network description 701 in rendering engine model (neural controller) 730. The neural network 710 can represent a neural network implementation of a rendering engine for rendering media data. The neural network description 701 can include a full specification of the neural network 710, including the neural network architecture 700. For example, the neural network description 701 can include a description or specification of the architecture 700 of the neural network 710 (e.g., the layers, layer interconnections, number of nodes in each layer, etc.); an input and output description which indicates how the input and output are formed or processed; an indication of the activation functions in the neural network, the operations or filters in the neural network, etc.; neural network parameters such as weights, biases, etc.; and so forth.

The neural network 710 reflects the architecture 700 defined in the neural network description 701. In this example, the neural network 710 includes an input layer 702, which includes input data, such images of user 102 and/or selected product(s) 108. In one illustrative example, the input layer 702 can include data representing a portion of the input media data such as a patch of data or pixels (e.g., a 128×128 patch of data) in an image corresponding to the input media data (e.g., that of user 102 and/or selected product(s) 108).

The neural network 710 includes hidden layers 704A through 704N (collectively "704" hereinafter). The hidden layers 704 can include n number of hidden layers, where n is an integer greater than or equal to one. The number of hidden layers can include as many layers as needed for a desired processing outcome and/or rendering intent. The neural network 710 further includes an output layer 706 that provides an output (e.g., rendering output 800) resulting from the processing performed by the hidden layers 704. In one illustrative example, the output layer 706 can provide an identification of user 102 and/or labeling information of selected product(s) 108.

The neural network 710 in this example is a multi-layer neural network of interconnected nodes. Each node can represent a piece of information. Information associated with the nodes is shared among the different layers and each layer retains information as information is processed. In some cases, the neural network 710 can include a feed-forward neural network, in which case there are no feedback connections where outputs of the neural network are fed back into itself. In other cases, the neural network 710 can include a recurrent neural network, which can have loops that allow information to be carried across nodes while reading in input.

Information can be exchanged between nodes through node-to-node interconnections between the various layers. Nodes of the input layer 702 can activate a set of nodes in the first hidden layer 704A. For example, as shown, each of the input nodes of the input layer 702 is connected to each of the nodes of the first hidden layer 704A. The nodes of the hidden layer 704A can transform the information of each input node by applying activation functions to the information. The information derived from the transformation can then be passed to and can activate the nodes of the next hidden layer (e.g., 704B), which can perform their own designated functions. Example functions include convolutional, up-sampling, data transformation, pooling, and/or any other suitable functions. The output of the hidden layer (e.g., 704B) can then activate nodes of the next hidden layer (e.g., 704N), and so on. The output of the last hidden layer can activate one or more nodes of the output layer 706, at which point an output is provided. In some cases, while nodes (e.g., nodes 708A, 708B, 708C) in the neural network 710 are shown as having multiple output lines, a node has a single output and all lines shown as being output from a node represent the same output value.

In some cases, each node or interconnection between nodes can have a weight that is a set of parameters derived from training the neural network 710. For example, an interconnection between nodes can represent a piece of information learned about the interconnected nodes. The interconnection can have a numeric weight that can be tuned (e.g., based on a training dataset), allowing the neural network 710 to be adaptive to inputs and able to learn as more data is processed.

The neural network 710 can be pre-trained to process the features from the data in the input layer 702 using the different hidden layers 704 in order to provide the output through the output layer 706. In an example in which the neural network 710 is used to identify user 102 and/or product(s) 108, the neural network 710 can be trained using training data that includes example images and facial features of user 102 and/or labeling and characteristic information (e.g., name, brand, size, etc.) of product(s) 108. For instance, training images can be input into the neural network 710, which can be processed by the neural network 710 to generate outputs which can be used to tune one or more aspects of the neural network 710, such as weights, biases, etc.

In some cases, the neural network 710 can adjust weights of nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training media data until the weights of the layers are accurately tuned.

For a first training iteration for the neural network 710, the output can include values that do not give preference to any particular class due to the weights being randomly selected at initialization. For example, if the output is a vector with probabilities that the object includes different product(s) and/or different users, the probability value for each of the different product and/or user may be equal or at least very similar (e.g., for ten possible products or users, each class may have a probability value of 0.1). With the initial weights, the neural network 710 is unable to determine low level features and thus cannot make an accurate determination of what the classification of the object might be. A loss function can be used to analyze errors in the output. Any suitable loss function definition can be used.

The loss (or error) can be high for the first training dataset (e.g., images) since the actual values will be different than the predicted output. The goal of training is to minimize the amount of loss so that the predicted output comports with a target or ideal output. The neural network 710 can perform a backward pass by determining which inputs (weights) most contributed to the loss of the neural network 710, and can adjust the weights so that the loss decreases and is eventually minimized.

A derivative of the loss with respect to the weights can be computed to determine the weights that contributed most to the loss of the neural network 710. After the derivative is computed, a weight update can be performed by updating the weights of the filters. For example, the weights can be updated so that they change in the opposite direction of the gradient. A learning rate can be set to any suitable value, with a high learning rate including larger weight updates and a lower value indicating smaller weight updates.

The neural network 710 can include any suitable neural or deep learning network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. In other examples, the neural network 710 can represent any other neural or deep learning network, such as an autoencoder, a deep belief nets (DBNs), a recurrent neural networks (RNNs), etc.

Figure 8:
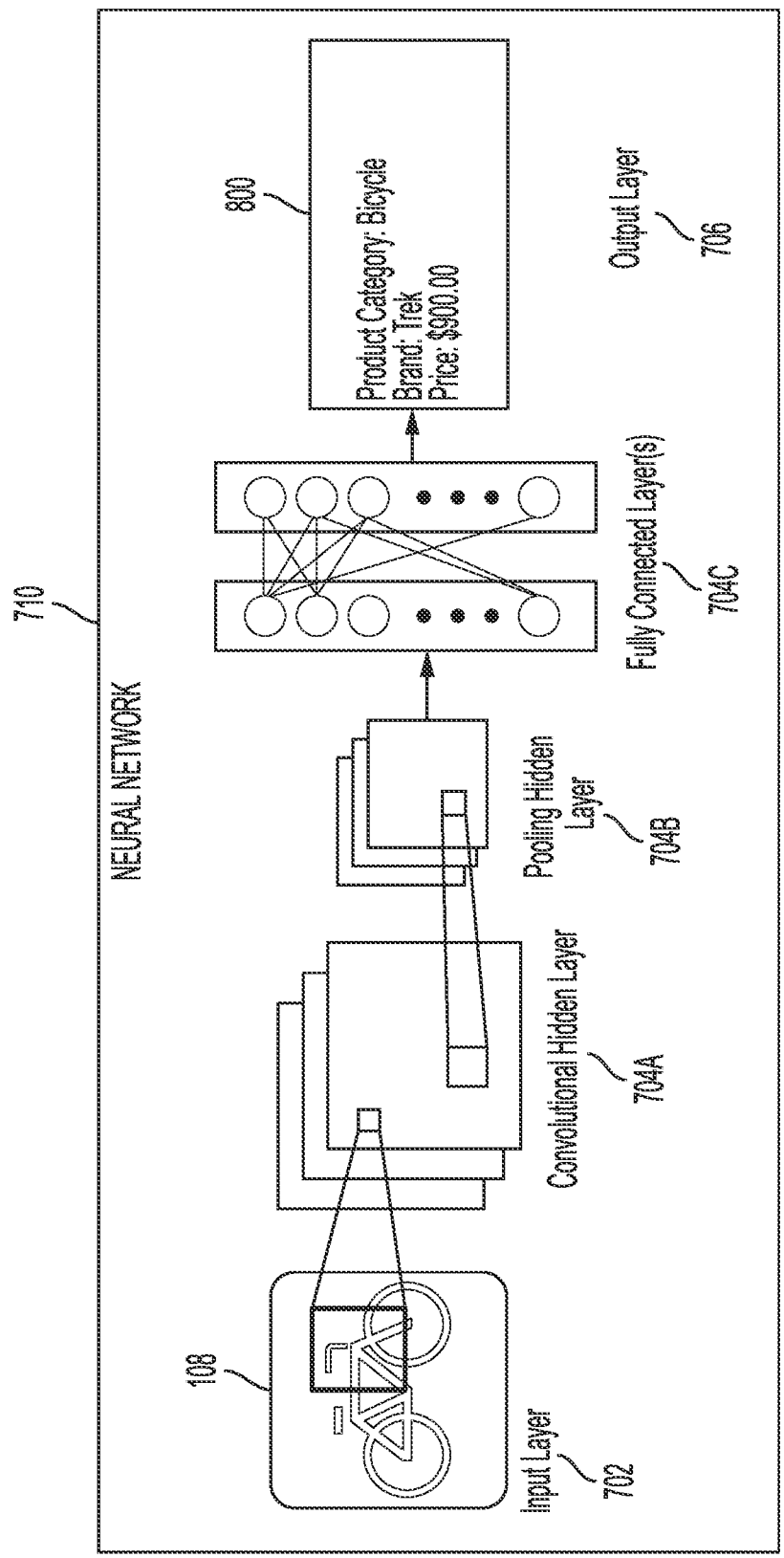
FIG. 8 illustrates an example use of a neural network of FIG. 7, according to one aspect of the present disclosure.

FIG. 8 illustrates an example use of a neural network of FIG. 7, according to one aspect of the present disclosure. FIG. 8 illustrates the use of the neural network 710 defined by the rendering engine model 730 for processing image data (e.g., a selected product 108 in facility 100 by user 102, which in example of FIG. 8 is a bicycle as shown).

In this example, the neural network 710 includes an input layer 702, a convolutional hidden layer 704A, a pooling hidden layer 704B, fully connected layers 704C, and output layer 706. The neural network 710 can render the input image data to generate a rendered image (e.g., output 800). First, each pixel or patch of pixels in the image data is considered as a neuron that has learnable weights and biases. Each neuron receives some inputs, performs a dot product and optionally follows it with a non-linearity function. The neural network 710 can also encode certain properties into the architecture by expressing a differentiable score function from the raw image data (e.g., pixels) on one end to class scores at the other and process features from the target image. After rendering portions of the image, the neural network 710 can generate a mean score (or z-score) of each rendered portion and take the average of the scores within the user-defined buffer.

In some examples, the input layer 704A includes raw or captured media data (e.g., 210). For example, the media data can include an array of numbers representing the pixels of an image, with each number in the array including a value from 0 to 255 describing the pixel intensity at that position in the array. The image can be passed through the convolutional hidden layer 704A, an optional non-linear activation layer, a pooling hidden layer 704B, and fully connected hidden layers 706 to get an output 800 at the output layer 706. The output 800 can be the identification and label information of the input data as shown in FIG. 8.

The convolutional hidden layer 704A can analyze the data of the input layer 702A. Each node of the convolutional hidden layer 704A can be connected to a region of nodes (e.g., pixels) of the input data (e.g., image). The convolutional hidden layer 704A can be considered as one or more filters (each filter corresponding to a different activation or feature map), with each convolutional iteration of a filter being a node or neuron of the convolutional hidden layer 704A. Each connection between a node and a receptive field (region of nodes (e.g., pixels)) for that node learns a weight and, in some cases, an overall bias such that each node learns to analyze its particular local receptive field in the input image.

The convolutional nature of the convolutional hidden layer 704A is due to each node of the convolutional layer being applied to its corresponding receptive field. For example, a filter of the convolutional hidden layer 704A can begin in the top-left corner of the input image array and can convolve around the input data (e.g., image). As noted above, each convolutional iteration of the filter can be considered a node or neuron of the convolutional hidden layer 704A. At each convolutional iteration, the values of the filter are multiplied with a corresponding number of the original pixel values of the image. The multiplications from each convolutional iteration can be summed together to obtain a total sum for that iteration or node. The process is next continued at a next location in the input data (e.g., image) according to the receptive field of a next node in the convolutional hidden layer 704A. Processing the filter at each unique location of the input volume produces a number representing the filter results for that location, resulting in a total sum value being determined for each node of the convolutional hidden layer 704A.

The mapping from the input layer 702 to the convolutional hidden layer 704A can be referred to as an activation map (or feature map). The activation map includes a value for each node representing the filter results at each locations of the input volume. The activation map can include an array that includes the various total sum values resulting from each iteration of the filter on the input volume. The convolutional hidden layer 704A can include several activation maps representing multiple feature spaces in the data (e.g., the image).

In some examples, a non-linear hidden layer can be applied after the convolutional hidden layer 704A. The non-linear layer can be used to introduce non-linearity to a system that has been computing linear operations.

The pooling hidden layer 704B can be applied after the convolutional hidden layer 704A (and after the non-linear hidden layer when used). The pooling hidden layer 704B is used to simplify the information in the output from the convolutional hidden layer 704A. For example, the pooling hidden layer 704B can take each activation map output from the convolutional hidden layer 704A and generate a condensed activation map (or feature map) using a pooling function. Max-pooling is one example of a function performed by a pooling hidden layer. Other forms of pooling functions can be used by the pooling hidden layer 704B, such as average pooling or other suitable pooling functions.

A pooling function (e.g., a max-pooling filter) is applied to each activation map included in the convolutional hidden layer 704A. In the example shown in FIG. 8, three pooling filters are used for three activation maps in the convolutional hidden layer 704A. The pooling function (e.g., max-pooling) can reduce, aggregate, or concatenate outputs or feature representations in the input (e.g., image). Max-pooling (as well as other pooling methods) offer the benefit that there are fewer pooled features, thus reducing the number of parameters needed in later layers.

The fully connected layer 704C can connect every node from the pooling hidden layer 704B to every output node in the output layer 706. The fully connected layer 704C can obtain the output of the previous pooling layer 704B (which can represent the activation maps of high-level features) and determine the features or feature representations that provide the best representation of the data. For example, the fully connected layer 704C layer can determine the high-level features that provide the best or closest representation of the data, and can include weights (nodes) for the high-level features. A product can be computed between the weights of the fully connected layer 704C and the pooling hidden layer 704B to obtain probabilities for different features.

The output from the output layer 706 can include product 108's labeling information including, but not limited to, product category, brand, price, etc. of the input media data.

While FIG. 8 describes the specific application of neural network of FIG. 7 to product identification and labeling, the same can be equally trained and applied to identify user 102.

Having described various examples of recording, monitoring and processing of claims between users, service providers and intermediary brokers as well as to improve the time consuming and costly adjudication process, the present disclosure now turns to description of architecture and elements of network components that be utilized to implement the processing system 112, cameras 110, user device 103 and/or any other hardware component for implementing object tracking and identification of the present disclosure, as described above.

Figure 9:
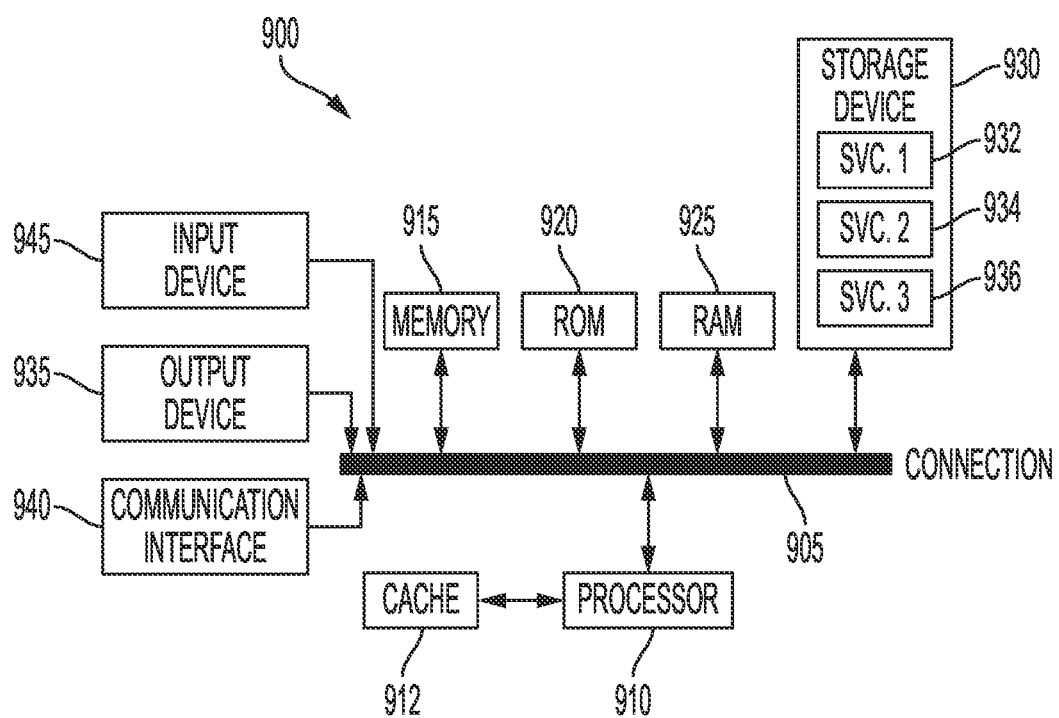
FIG. 9 illustrates an example computing system architecture, according to one aspect of the present disclosure.

FIG. 9 illustrates an example computing system architecture, according to one aspect of the present disclosure. 900 of a computing device which can implement the various techniques described herein. The components of the computing system architecture 900 are shown in electrical communication with each other using a connection 905, such as a bus. The example computing device 900 includes a processing unit (CPU or processor) 910 and a computing device connection 905 that couples various computing device components including the computing device memory 915, such as read only memory (ROM) 920 and random access memory (RAM) 925, to the processor 910. The computing device 900 can include a cache of high-speed memory connected directly with, in close proximity to, or integrated as part of the processor 910. The computing device 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components, computing devices and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A computer-implemented method, comprising:
receiving at a processing system, a plurality of images corresponding to a user, wherein the plurality of images are associated with a plurality of cameras, and wherein the plurality of images represent the user;
using the plurality of images and the processing system to identify the user;
detecting an item selected by the user, wherein detection is done by the processing system and throughout a facility;
generating a visual model of the item, wherein the visual model is generated using the processing system;
using the processing system to associate one or more instances of the visual model and one or more corresponding spatial coordinates with one or more of the plurality of cameras throughout the facility;
tracking movement of the item throughout the facility, wherein tracking is based on instances of the visual model and corresponding spatial coordinates associated with the one or more of the plurality of cameras;
determining whether the item is selected for purchase, wherein the determination is based on the tracked movement, and wherein the determination is made by the processing system;
detecting that the user is leaving the facility, wherein the detection is performed by the processing system; and
processing a transaction for the item when the item is selected for purchase and when the user has left the facility, wherein processing of the transaction is done by the processing system.

2. The computer-implemented method of claim 1, further comprising:
associating the item detected with the user.

3. The computer-implemented method of claim 2, wherein associating the item detected with the user comprises:
capturing an image of the user at a time of selecting the item; and
comparing the image with one of the plurality of images of the user to identify the user and associating the item with the user.

4. The computer-implemented method of claim 3, wherein the comparing is performed using a deep neural network trained to identify users using a machine learning algorithm.

5. The computer-implemented method of claim 1, wherein the item is detected using a deep neural network trained to identify and label the item.

6. The computer-implemented method of claim 1, wherein the visual model is a 2-dimensional representation of the item.

7. The computer-implemented method of claim 6, wherein tracking the item is based on the 2-dimensional representation of the item.

8. The computer-implemented method of claim 1, wherein the instances of the visual model of the item are 2-dimensional representations of the item.

9. The computer-implemented method of claim 1, wherein detecting that the user is leaving the facility comprises:
detecting the user in proximity of an entrance of the facility at a first time that is after a second time at which the plurality of images of the user are captured.

10. The computer-implemented method of claim 1, wherein processing the transaction includes a cardless payment transaction and no financial information are exchanged between the user and an operator of the facility.

11. A processing system comprising:
memory having computer-readable instructions stored therein; and
one or more processors configured to execute the computer-readable instructions to:
receive a plurality of images corresponding to a user, each of the plurality of images are associated with a plurality of cameras, and wherein the plurality of images represent the user;
identify, using the plurality of images, the user;
detect, throughout a facility, an item selected by the user;
generate a visual model of the item;
associate one or more instances of the visual model and one or more spatial coordinates with one or more of the plurality of cameras;
track movement of the item throughout the facility based on instances of the visual model and the corresponding spatial coordinates associated with the one or more of the plurality of cameras;
determine whether the item is selected for purchase based on the tracked movement;
detect that the user is leaving the facility; and
process a transaction for the item when the item is selected for purchase and when the user has left the facility.

12. The processing system of claim 11, wherein the one or more processors are further configured to execute the computer-readable instructions to:
associate the item detected with the user.

13. The processing system of claim 12, wherein the one or more processors are configured to execute the computer-readable instructions to associate the item detected with the user by:
   capturing an image of the user at a time of selecting the item; and
   comparing the image with one of the plurality of images of the user to identify the user and associating the item with the user.

14. The processing system of claim 13, wherein the one or more processors are configured to execute the computer-readable instructions to compare the image with one of the plurality of images of the user using a deep neural network trained to identify users using a machine learning algorithm.

15. The processing system of claim 11, wherein the one or more processors are configured to execute the computer-readable instructions to detect the item using a deep neural network trained to identify and label the item.

16. The processing system of claim 11, wherein the visual model is a 2-dimensional representation of the item.

17. The processing system of claim 16, wherein the one or more processors are configured to execute the computer-readable instructions to track the item based on the 2-dimensional representation of the item.

18. The processing system of claim 11, wherein the instances of the visual model of the item are 2-dimensional representations of the item.

19. The processing system method of claim 11, wherein the one or more processors are configured to execute the computer-readable instructions to:
   detect that the user is leaving the facility by detecting the user in proximity of an entrance of the facility at a first time that is after a second time at which the plurality of images of the user are captured.

20. The processing system method of claim 11, wherein processing the transaction includes a cardless payment transaction and no financial information are exchanged between the user and an operator of the facility.

21. One or more non-transitory computer-readable media comprising computer-readable instructions, which when executed by one or more processors, cause the one or more processors to:
   receive a plurality of images corresponding to a user, each of the plurality of images are associated with a plurality of cameras, and wherein the plurality of images represent the user;
   identify, using the plurality of images, the user;
   detect, throughout a facility, an item selected by the user;
   generate a visual model of the item;
   associate one or more instances of the visual model and one or more spatial coordinates with one or more of the plurality of cameras;
   track movement of the item throughout the facility based on instances of the visual model and the corresponding spatial coordinates associated with the one or more of the plurality of cameras;
   determine whether the item is selected for purchase based on the tracked movement;
   detect that the user is leaving the facility; and
   process a transaction for the item when the item is selected for purchase and when the user has left the facility.

22. The one or more non-transitory computer-readable media of claim 21, wherein the execution of the computer-readable instructions by the one or more processors further cause the one or more processors to:
   associate the item detected with the user.

23. The one or more non-transitory computer-readable media of claim 22, wherein the execution of the computer-readable instructions by the one or more processors further cause the one or more processors to associate the item detected with the user by:
   capturing an image of the user at a time of selecting the item; and
   comparing the image with one of the plurality of images of the user to identify the user and associating the item with the user.

24. The one or more non-transitory computer-readable media of claim 23, wherein the execution of the computer-readable instructions by the one or more processors further cause the one or more processors to compare the image with one of the plurality of images of the user using a deep neural network trained to identify users using a machine learning algorithm.

25. The one or more non-transitory computer-readable media of claim 21, wherein the execution of the computer-readable instructions by the one or more processors further cause the one or more processors to detect the item using a deep neural network trained to identify and label the item.

26. The one or more non-transitory computer-readable media of claim 21, wherein the visual model is a 2-dimensional representation of the item.

27. The one or more non-transitory computer-readable media of claim 26, wherein the execution of the computer-readable instructions by the one or more processors further cause the one or more processors to track the item based on the 2-dimensional representation of the item.

28. The one or more non-transitory computer-readable media of claim 21, wherein the instances of the visual model of the item are 2-dimensional representations of the item.

29. The one or more non-transitory computer-readable media of claim 21, wherein the execution of the computer-readable instructions by the one or more processors further cause the one or more processors to detect that the user is leaving the facility by detecting the user in proximity of an entrance of the facility at a first time that is after a second time at which the plurality of images of the user are captured.

30. The one or more non-transitory computer-readable media of claim 21, wherein processing the transaction includes a cardless payment transaction and no financial information are exchanged between the user and an operator of the facility.

* * * * *